July 4, 1961　　　　　　　　C. D. VOLZ　　　　　　　2,991,421
FISH GUIDANCE DIRECT CURRENT SWITCHING DEVICES
Filed Nov. 19, 1959　　　　　　　　　　　　　　　　10 Sheets-Sheet 1

July 4, 1961  C. D. VOLZ  2,991,421
FISH GUIDANCE DIRECT CURRENT SWITCHING DEVICES
Filed Nov. 19, 1959  10 Sheets-Sheet 7

July 4, 1961  C. D. VOLZ  2,991,421
FISH GUIDANCE DIRECT CURRENT SWITCHING DEVICES
Filed Nov. 19, 1959  10 Sheets-Sheet 9

United States Patent Office 2,991,421
Patented July 4, 1961

---

2,991,421
FISH GUIDANCE DIRECT CURRENT SWITCHING DEVICES
Charles Daniel Volz, Seattle, Wash., assignor to the United States of America as represented by the Secretary of the Interior
Filed Nov. 19, 1959, Ser. No. 854,215
6 Claims. (Cl. 328—62)
(Granted under Title 35, U.S. Code (1952), sec. 266)

The invention described herein may be manufactured and used by or for the Government of the United States for governmental purposes without the payment to me of any royalty thereon in accordance with the provisions of 35 U.S.C. 266.

This invention relates to direct current switching devices and more particularly to such a device adapted to be used in connection with a fish guidance system.

In the past the annual downstream migration of fish such as salmon have caused the loss of a great number of these fish. These losses were partially due to irrigation diversions, power plants, dams and other obstructions which either diverted the fish or created hazards causing their destruction by concentrating them in front of such objects as mechanical screens, or exposing them to predatory fish and birds. One solution to this problem is to take advantage of the anodic electrotactic response of fish to interrupted direct current by causing such interrupted direct current to move the fish away from such hazards. The direct current switching device of the present invention will produce a pulsating, unidirectional electric field between paired sets of electrodes in a volume of water. This electric field will progress from one pair of electrode sets to a succeeding pair of electrode sets so that the fish will be moved toward the positive electrode end, which will normally be situated so that the fish movement will carry them to a place of safe passage.

It is an object of this invention to provide a new and improved direct current switching device.

Another object of this invention is to provide a new and improved direct current switching device in which direct current is interrupted and switched to a plurality of destinations.

A further object of this invention is to provide a new and improved direct current switching device which can sequence a direct current source to a number of fish guidance electrodes in a preselected and programmed order.

Other objects and advantages of the invention will be apparent during the course of the following description, when read in connection with the accompanying drawing; wherein:

Figure 1:
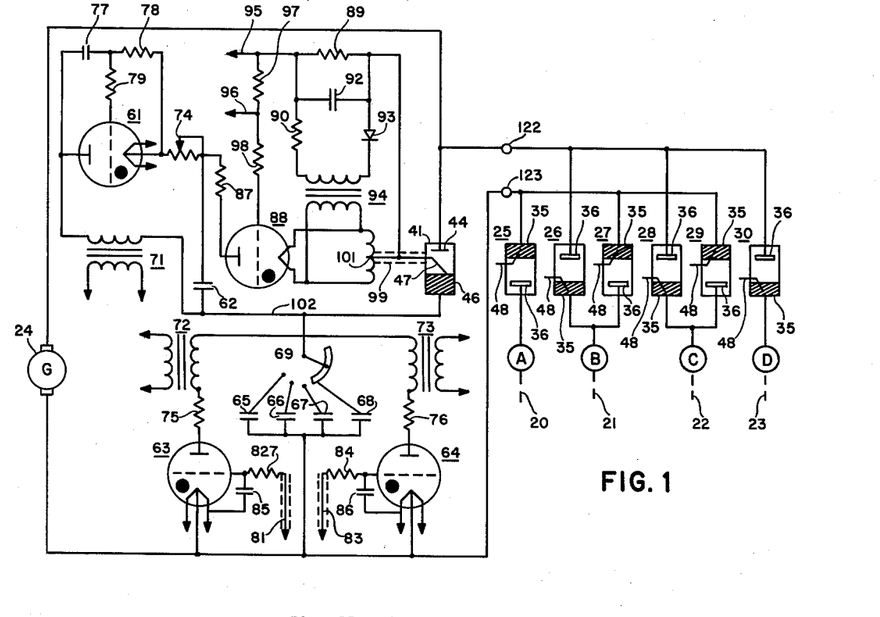
FIG. 1 is a circuit diagram illustrating a three sequential electric field energization arrangement.

Referring now more particularly to FIG. 1 of the drawing, there are shown four electrodes 20, 21, 22 and 23. These electrodes are suitably positioned in the water of a stream or lake so that electric fields of sufficient intensity may be obtained between paired electrodes 20—21, 21—22, and 22—23 when current is allowed to flow through these paired electrodes. These electric fields will be identified hereafter by the capital letters applied to the electrodes 20, 21, 22, 23. The cyclical sequence of energization of these electrodes create the following sequential fields: AB—Off—B, C—Off—C, D—Off—A, B—etc. These sequential fields are created by allowing current from a D.C. generator 24 to flow through the appropriate control electrodes 25, 26, 27, 28, 29 and 30. To create the sequential electric field identified above, these control electrodes have to be energized in the following sequence: 25, 26—Off—27, 28—Off—29, 30—Off—25, 26—etc. The term Off as used in the above field and control rectifier sequences indicates the period between field energizations during which no current flows from the D.C. generator 24 through any of the control rectifiers 25 to 30, inclusive.

Figure 2:
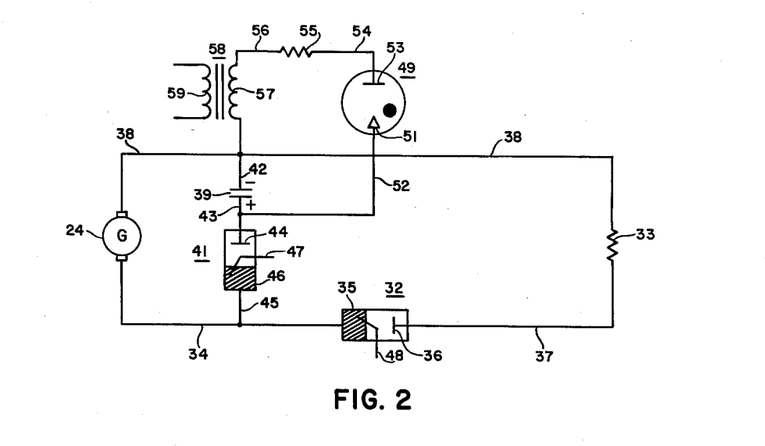
FIG. 2 is a simplified schematic diagram illustrating the principle used to interrupt the output of the D.C. generator sequentially energizing the electrodes of the device embodying the invention.

A simplified schematic diagram of the method used to interrupt the output of the D.C. generator 24 feeding the electrodes 20, 21, 22 and 23 is shown in FIG. 2. Ignitron 32 may be considered any one of the control rectifiers 25 to 30 inclusive of FIG. 1. As long as ignitron 32 is conducting the current from D.C. generator 24, that current will be flowing through the particular electrode load 20, 21, 22 or 23 which is represented by the resistive load 33 in FIG. 2. Appropriate conductors 34 connect one terminal of the D.C. generator 24 to the cathode side 35 of the ignitron 32. The plate side 36 of the ignitron 32 is connected by a conductor 37 to one side of the load 33. The other side of the load 33 is connected by a conductor 38 to the other side of the D.C. generator 24. Connected in parallel with generator 24 between leads 38 and 34 are a capacitor 39 and an ignitron 41. A conductor 42 connects one side of the capacitor 39 to conductor 38. A conductor 43 connects the other side of capacitor 39 to the plate 44 of the ignitron 41. A conductor 45 connects the cathode side 46 of the ignitron 41 to conductor 34. Ignitron 41 has a control electrode 47 and ignitron 32 has a control electrode 48. As is well known in the art, application of a sufficient positive voltage for a minimum period of time to the control grid of an ignitron will cause this ignitron to "ignite" and start conducting current between the plate and the cathode when the plate is positively biased with respect to the cathode.

The Off ignitron 41 of FIG. 2 is identified by the same numeral in FIG. 1 where it performs the same function. That function is the interruption and termination of the current flow through the On tube 32, and may be any one of the then conducting control rectifiers 25 to 30, inclusive. A charging tube 49 has its cathode connected through conductor 52 to conductor 43, common to capacitor 39 and Off ignitron 41. The plate 53 of the charging tube 49 is connected by means of a conductor 54 to one side of a resistor 55. The other side of the resistor 55 is connected through a conductor 56 to one side of the secondary winding 57 of a transformer 58. An alternating current voltage is applied to the primary winding 59 of the transformer 58 and is rectified by the charging tube 49 acting as a half wave rectifier.

When ignitrons 41 and 48 are non-conducting (deionized), the half wave rectifier 49 conducts on a positive half cycle of the alternating current, charging capacitor 49 so as to have an excess of electrons on the upper plate of that condenser. When ignitron 32 conducts the generator voltage is applied across the load and since there is no discharge path for the capacitor 39, the potential across the plates of that capacitor remains.

When Off ignitron 41 is fired the instantaneous potential across the series connected capacitor 39 and ignitron 41 is the sum of the capacitor 39 and generator 24 voltages. As an example, let us assume that the bottom plate of the capacitor 39 is 500 volts positive with respect to the upper plate. At that same instance, let us consider the generator 24 to be a 500 volt battery connected as shown in series with the capacitor 39, and with the indicated polarity. This is equivalent to connecting two 500 volt batteries in series. When ignitron 41 is fired the polarity of the voltage across the series connected capacitor 39 and ignitron 41 is reversed and the On tube 32 becomes non-conducting. The capacitor 39 discharges through the armature of the generator 24 and when the bottom plate of the capacitor 39 becomes sufficiently negative, ignitron 41 stops conducting. At this time the generator voltage is again present across the series connected capacitor 39 and ignitron 41. If the time constant of the capacitor 39 and inductance of the armature of the generator 24 is sufficient to allow the potential across the series connected capacitor 39 and ignitron 41 to remain negative for more than the deionization time, ignitron 32 will remain non-conducting when the generator voltage is returned to normal. The generator voltage may now be impressed across the load by igniting ignitron 32. This is accomplished by providing an appropriate firing pulse at control grid 48 of the ignitron 32.

Figure 5:
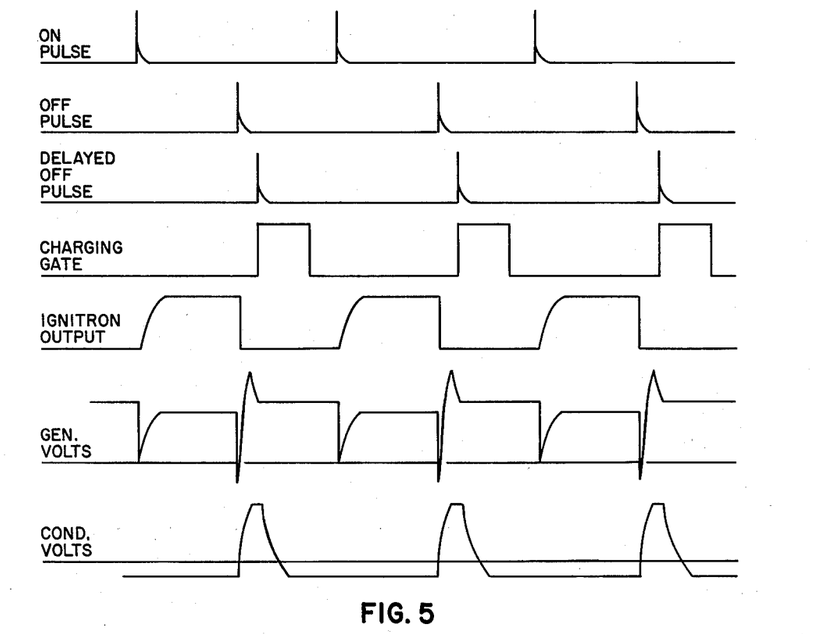
Fig. 5 shows the wave forms occurring at various circuit locations of the device embodying the invention.

In FIG. 1 there is shown one charging tube 61 for charging the firing capacitor 62. Two further charging tubes 63 and 64 are used to charge one or more of the capacitors 65, 66, 67 or 68 as selected by the switch 69. Transformers 71, 72 and 73 perform the same function for their respective charging tubes 61, 63 and 64 as is performed by transformer 58 in FIG. 2. Variable resistor 74 and resistors 75 and 76 in FIG. 1 perform the same function for their respective charging tubes as current limiting resistor 55 in FIG. 2. Capacitor 77 and resistors 78 and 79 function as a phase advance network so as to steepen the pulse of D.C. voltage applied to firing capacitor 62. Charging tubes 63 and 64 are actuated by a charging gate obtained from the control unit. The time relationship of this charging gate to the Off pulse and delayed Off pulse is shown in FIG. 5. The charging gate is applied through a conductor 81 and a resistor 82 to the grid of charging thyratron 63. The charging gate is also applied through a conductor 83 and a resistor 84 to the grid of charging thyratron 64. Charging thyratrons 63 and 64 function in a gated full-wave circuit. Capacitors 85 and 86 used with charging thyratrons 63 and 64, respectively, serve as a filter. The voltage appearing across capacitor 62 is applied through a grid current limiting resistor 87 to the plate of a firing thyratron 88. The cathode of the firing thyratron 88 is biased by a filter-rectifier network consisting of resistors 89, 90, capacitor 92 and rectifiers 93. The output of this network is applied to the cathode of firing thyratron 88 through the transformer 94.

Figure 3:
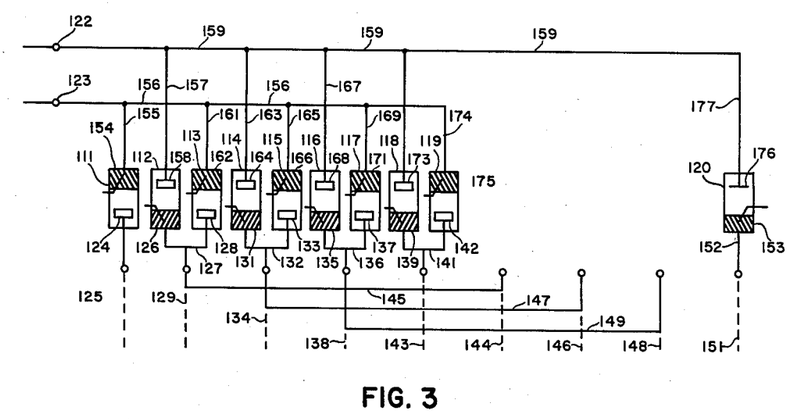
FIG. 3 is a schematic diagram showing the arrangement of the electrode control devices for an eight sequential electric field energization configuration with single-polarity and electrodes.

The Off tube firing pulse is applied from the control unit (FIGS. 6 and 11) to conductors 95 and 96 of FIG. 1. This Off pulse is shown in FIG. 5. It is applied across input resistor 97 in FIG. 1 through grid current limiting resistor 98 to the grid of firing thyratron 88. The control grid 47 of the Off ignitron 41 is connected through a conductor 99 to the center tap of a winding 101. The ends of the winding 101 are connected to the respective filament leads of firing thyratron 88. When an Off tube firing pulse is applied through conductors 95 and 96 to the grid of firing thyratron 88, that tube will conduct electrons from the bottom plate of capacitor 62 through a conductor 102, through the cathode 46 of Off ignitron 41, control electrode 47, conductor 99, and winding 101 so as to discharge the capacitor 62. This ignites the Off tube 41 which then in turn discharges one or more of the capacitors 65 to 68 inclusive, as selected, through the generator winding 24. The more of the capacitors 65 to 68 inclusive have been placed in the circuit by the selector switch 69, the longer period of time for the discharge of these capacitors.

Where an eight field energization arrangement is desired, the embodiment of FIG. 3 can be used. The ten On tubes of FIG. 3, 111 to 120 inclusive, are connected at terminals 122 and 123 to the identically numbered terminals in FIG. 1 and in place of the control tubes 25 to 30, inclusive, shown there. Control ignitron 111 has a plate 124 connected to an electrode 125. Control ignitron 112 has its cathode 126 connected through a conductor 127 to the plate 128 of control ignitron 113. Conductor 127 is also connected to electrode 129. Control ignitron 114 has its cathode 131 connected through a conductor 132 to the plate 133 of the control ignitron 115. An electrode 134 is connected to the conductor 132. The cathode 135 of the control ignitron 116 is connected through a conductor 136 to the plate 137 of the control ignitrol 117. An electrode 138 is connected to the conductor 136. The cathode 139 of ignitron 118 is connected through a conductor 141 to the plate 142 of ignitron 119. An electrode 143 is connected to the conductor 141. An electrode 144 is connected through a conductor 145 to electrode 129 and conductor 127. An electrode 146 is connected through a conductor 147 to electrode 134 and conductor 132. An electrode 148 is connected through a conductor 149 to electrode 138 and conductor 136. An electrode 151 is connected through a conductor 152 to the cathode 153 of ignitron 120. The cathode 154 of ignitron 111 is connected through a conductor 155 to a bus 156 which in turn connects to the terminal 123. A conductor 157 connects the plate 158 of ignitron 112 to a conductor 159 which in turn is connected to terminal 122. A conductor 161 connects the cathode 162 of ignitron 113 to the bus 156. A conductor 163 connects the plate 164 of ignitron 114 to bus 159. A conductor 165 connects the cathode 166 to bus 156. A conductor 167 connects plate 168 of ignitron 116 to conductor 159. A conductor 169 connects the cathode 171 of ignitron 117 to conductor 156. A conductor 172 connects the plate 173 of ignitron 118 to bus 159. A conductor 174 connects the cathode 175 of the ignitron 119 to the bus 156. Plate 175 of ignitron 120 is connected through a conductor 177 to bus 159.

It is thus seen that the arrangement of the On ignitrons of FIG. 3 is somewhat comparable to that of the On ignitrons of FIG. 1. In FIG. 1 the plates of On ignitrons 26, 28 and 30 are connected through a bus to common terminal 122 while the cathode of On ignitrons 25, 27 and 29 are connected through a bus to a common terminal 123. At the same time, FIG. 1, the cathode of ignitron 26 is connected to the plate of ignitron 27 and electrode 21 while the cathode of ignitron 28 is connected to the plate of ignitron 29 and the electrode 22. Electrode 20 of FIG. 1 is connected to the plate of ignitron 25 and electrode 23 is connected to the cathode of ignitron 30.

The sequence of energization of the ignitron configuration of FIG. 3 can be best set forth by identifying the sequence of actuation of the On ignitrons in that figure. It is as follows: 111, 112, 119—Off—113, 114—Off—115, 116—Off—117, 118, 120—Off—111, 112, 119—etc. It is seen that the cycle is repetitive as is to be expected when one keeps in mind that it is the sequential programmed energization of a series of properly positioned electrodes which permits the guidance of fish.

Figure 4:
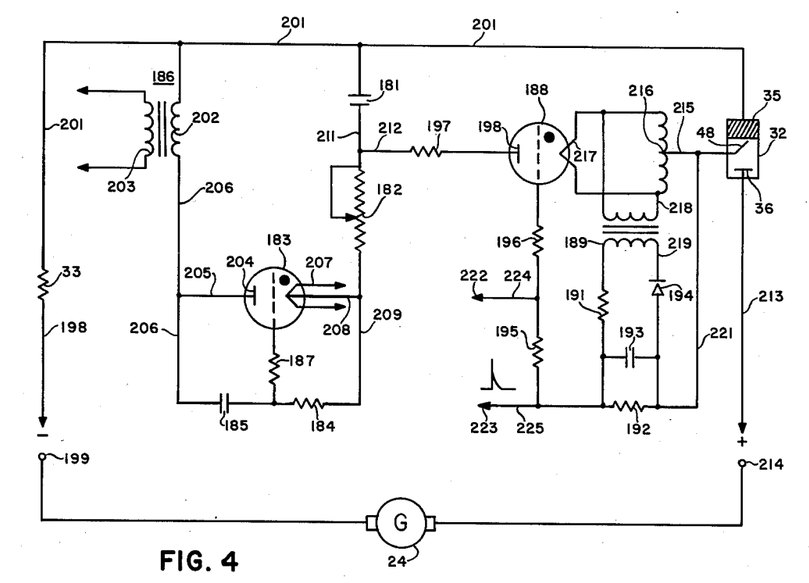
FIG. 4 is a schematic wiring diagram of the ignitor firing circuit used to energize the control ignitrons shown in FIGS. 1 and 3.

The firing circuit used for all ignitron firing circuits is shown in FIG. 4. It is the output of these firing circuits which provides enough of a current flow through the control electrodes 48 of FIG. 1 and FIG. 3 to cause these ignitrons to be ignited and to conduct at a time selected by the control unit in conjunction with the sequencing unit. It will be noted that the Off ignitron control circuit of FIG. 1 is similar to that of the On ignitron control circuit of FIG. 4. The ignitron 32 is fired by a thyratron controlled capacitor discharge. The firing capacitor 181 is charged through a variable resistor 182 by the rectifier 183. The network consisting of resistor 184 and capacitor 185 is a phase advance network which causes the tube to fire very early in the positive half cycle of the A.C. generator input to a transformer 186. A grid resistor 187 limits the peak grid currents of tube 183.

In the specific embodiment, the firing thyratron 188 is initially biased to 100 volts on the grid by the biasing circuit consisting of transformer 189, resistor 191, resistor 192, capacitor 193 and rectifier 194. When a firing pulse of sufficient amplitude (greater than 115 volts) is applied across the input resistor 195, the thyratron 188 begins to conduct. Grid resistor 196 serves to limit the peak grid current. The capacitor 181 discharges through limiting resistor 197, firing thyratron 188 and the ignitor control grid 48 through the cathode pool of the ignitron 32 which is positioned in the cavity of the cathode 35 of the ignitron 32. The peak current in the specific embodiment is from 40 to 65 amperes, and the voltage is greater than 200 volts for 150 microseconds. This current is sufficient to vaporize and ionize the mercury in the cathode pool of ignitron 32 at the point where the ignitor rod dips into the cathode pool. The ignitor rod is formed by the control grid 48. If sufficient positive anode voltage is applied between the cathode 35 and the plate 36 of the ignitron 32 at this time the ignitron begins to conduct current through the load 33. As has been previously noted, the load 33 is equivalent to one of the pairs of the electrodes represented, for example, by the field created between electrodes 20 and 21 when ignitrons 25 and 26 are energized.

In FIG. 4 one side of the load 33 is shown connected through a conductor 198 to the negative terminal 199 of the generator 24 while the other side of the load 33 is connected through a conductor 201 to one side of the secondary 202 of the transformer 186. In the specific embodiment, the primary 203 of the transformer 186 is fed with 110 volts at 60 cycles per second. The plate 204 of thyratron 183 is connected through conductors 205 and 206 to one side of the capacitor 185. Conductor 206 is also connected to the other side of the transformer secondary 202. One side of the grid current limiting resistor 187 is connected to the grid of thyratron 183 while the other side of that resistor is connected to the juncture between series connected resistor 184 and capacitor 185. The center tap of the filament 207 of the thyratron 183 is connected through a conductor 208 to a conductor 209. Conductor 209 connects at one end to resistor 184 and at the other end to variable resistor 182. The other end of variable resistor 182 is connected through a conductor 211 to one side of capacitor 181 and also through a conductor 212 to one side of plate resistor 197. The other side of plate resistor 197 connects to the plate 198 of the thyratron 188. The conductor 201 is also connected to the cathode 35 of ignitron 32 and capacitor 181. The plate 36 of ignitron 32 is connected through a conductor 213 to the positive terminal 214 of generator 24. The control grid 48 of ignitron 32 is connected through a conductor 215 to the center tap of a winding 216. The ends of the winding 216 are connected to the respective ends of the filament 217 of the thyratron 188. The secondary 218 of transformer 189 is connected in parallel with the filament of the thyratron 188. The primary 219 of the transformer 189 is connected in series with resistor 191, capacitor 193 and rectifier 194. Resistor 192 is connected in parallel with capacitor 193. A conductor 221 connects the control grid 48 of the ignitron 32 to the juncture of resistor 192, capacitor 193 and rectifier 194.

The firing pulse is obtained from the sequential switching unit which in turn is actuated by appropriate pulses from the control unit. The firing pulse is applied from the output of the pulse amplifiers of the sequential switching unit (FIG. 14) to input terminal 222 and 223 of the ignitor firing circuit of FIG. 4. Input terminal 222 is connected by a conductor 224 to the juncture point of resistors 195 and 196. Input terminal 223 is connected by a conductor 225 to the juncture point between resistors 195, 191 and 192. It should of course be understood that every ignitron must have its own ignitor firing circuit and that these ignitor firing circuits are actuated in a sequence determined by the firing pulse output of the pulse amplifiers of FIG. 14.

Figure 6:
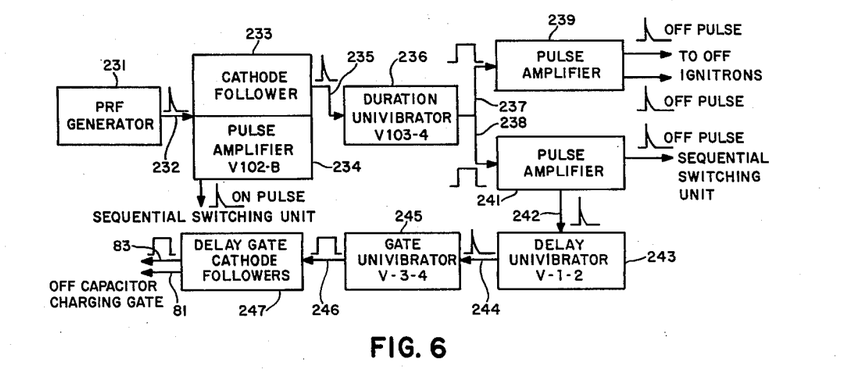
FIG. 6 is a block diagram of the control unit.
Figure 10:
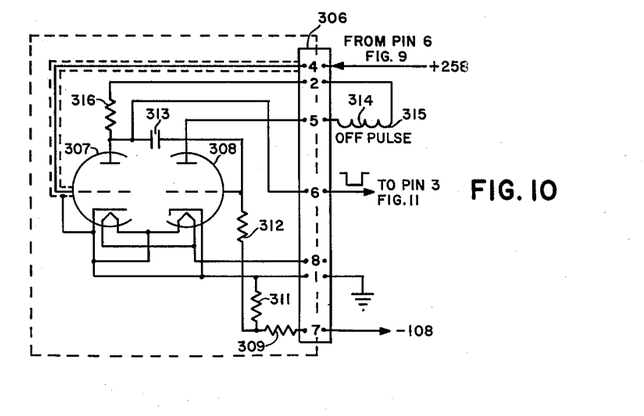
FIG. 10 is a schematic diagram of a pulse amplifier used in the control unit of FIG. 6.
Figure 11:
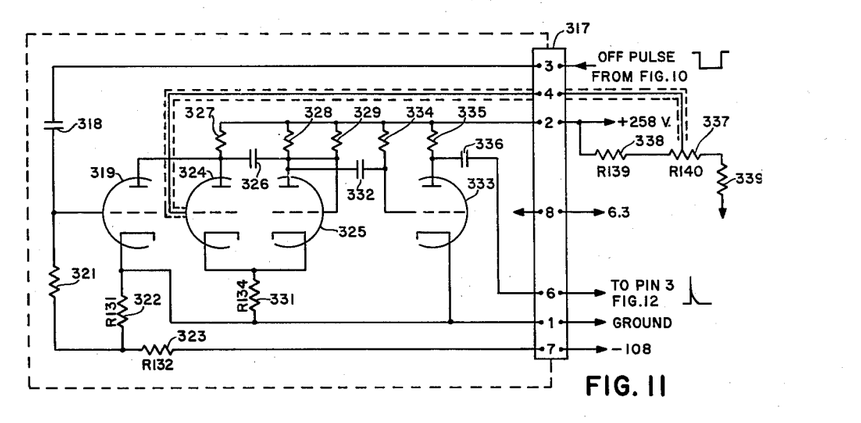
FIG. 11 is a schematic diagram of an amplifier and delay univibrator used in the control unit of FIG. 6.
Figure 12:
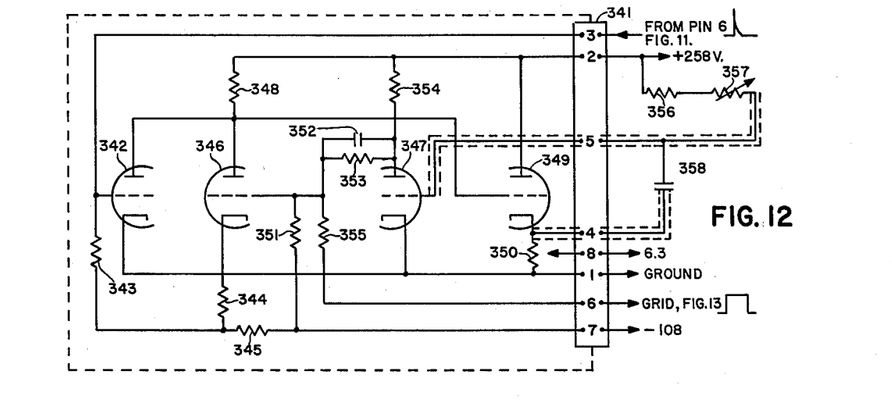
FIG. 12 is a schematic diagram of a gate univibrator used in the control unit of FIG. 6.
Figure 13:
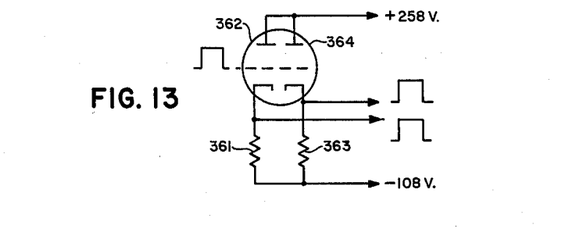
FIG. 13 is a schematic diagram of a cathode follower used as a delayed gate circuit in the control unit of FIG. 6.
Figure 14:
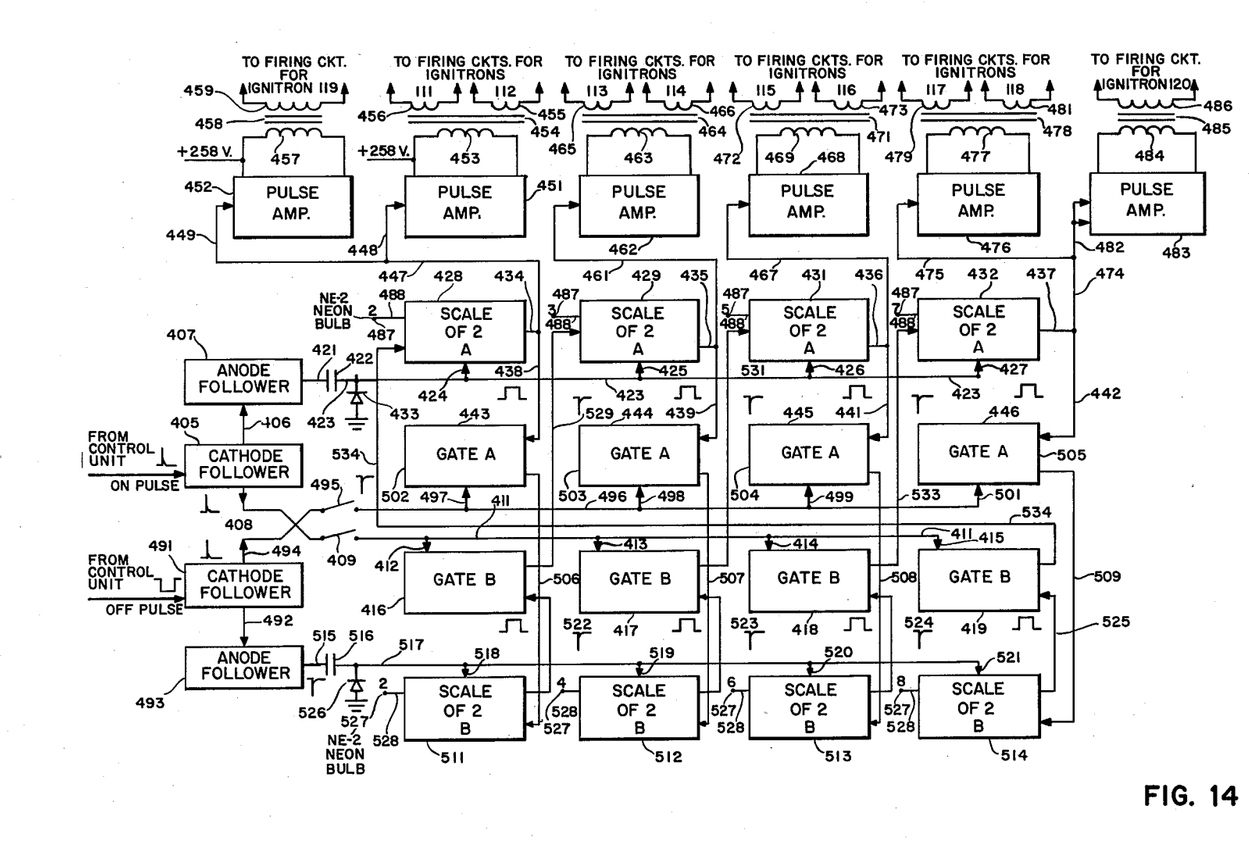
FIG. 14 is a block diagram of the sequential switching unit for the duplicated 4-field array of FIG. 3.

The control unit showing in FIG. 6 serves the function of synchronizing and timing the operation of the various units of the device. Specifically it provides On and Off pulses which trigger the operation of the sequential switching unit. The sequential switching unit of FIG. 14 in turn provides the trigger pulses for the On ignitron firing circuits. The control unit also triggers the operation of the Off ignitrons, or more correctly, the firing circuits for these Off ignitrons. The control unit further provides two charging gate pulses for the Off capacitor which are fed to the rectifier grids of tubes 63 and 64 of FIG. 1. In the control unit, FIG. 6, a P.R.F. generator 231 feeds a positive trigger pulse through a conductor 232 to a cathode follower 233. The positive going output from the cathode follower 233 is fed to a pulse amplifier 234 and also applied through a conductor 235 to a duration univibrator 236. The output from the pulse amplifier 234 is a positive going On pulse which is applied to the sequential switching unit (FIG. 14). The duration univibrator 236 (FIG. 9) converts the positive going input pulse to a square wave pulse which may be selected to have either a short or a long pulse duration. The square wave output of duration univibrator 236 is applied through conductors 237 and 238 to pulse amplifiers 239 and 241, respectively. The output of pulse amplifier 239 (FIG. 10) is applied to the Off ignitrons (FIG. 1, input conductors 95, 96). The output of pulse amplifier 241 provides an Off pulse to the sequential switching unit (FIG. 14). The output of pulse amplifier 241 is also applied through a conductor 242 to a delay univibrator 243 (FIG. 11). The delay univibrator 243 provides a delayed positive going pulse output of the Off pulse. This is applied through a conductor 244 to a gate univibrator 245 (FIG. 12). The gate univibrator 245 provides a square wave output through a conductor 246 to a delay gate cathode follower 247 (FIG. 13). The square wave output of the delay gate cathode follower 247 provides the Off capacitor charging gate through conductors 81 and 83 to tubes 63 and 64 of FIG. 1. The delay gate cathode follower outputs are preferably provided through separate cathode followers 247 rather than a single cathode follower so that conductors 81 and 83 are decoupled from one another.

Figure 7:
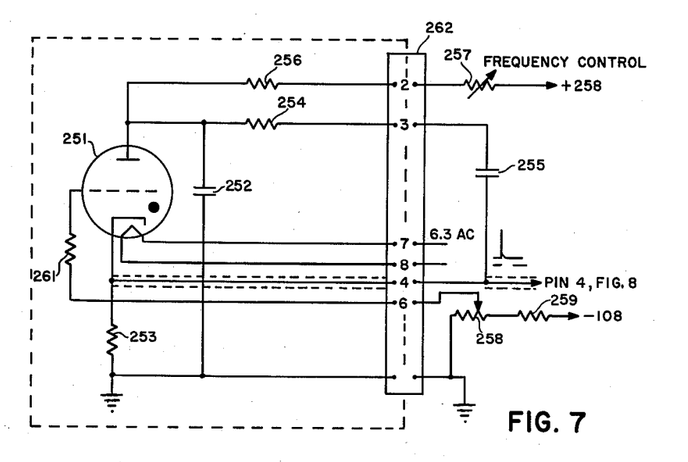
FIG. 7 is a schematic diagram of the P.R.F. generator used in the control unit of FIG. 6.

The P.R.F. generator, FIG. 7, produces a regularly recurring positive pulse or trigger, which may be varied in frequency from 2 to 30 pulses per second.

The P.R.F. generator, FIG. 7, is the primary frequency determining element of applicant's invention. It consists of a thyratron oscillator utilizing a gaseous triode 251. The period of oscillation of this triode is determined by the size of resistors 256, 257 and the value of capacitance of capacitors 252 and 255. Since the lower end of capacitor 255 is connected to the cathode instead of ground the duration of the trailing edge of the pulse is determined only by the time constant of capacitor 252 and resistor 253 and does not vary with changes in frequency of the P.R.F. generator. The output signal developed across resistor 253 is the timing pulse used to trigger the various delay and gate circuits of applicant's device. The frequency of this trigger can be varied by adjusting variable resistor 257, which determines the time required to reach the ionizing potential of thyratron 251. The calibrate control consists of potentiometer 258 and resistor 259 connected in series across a negative bias and which have their common terminals connected to one end of grid resistor 261 to provide a variable bias. The other end of grid resistor 261 is connected to the control grid of the triode 251. In synchronizing the frequency of the oscillator with a standard external frequency source the bias on the grid of the thyratron 251 is changed by adjusting potentiometer 258.

Figure 8:
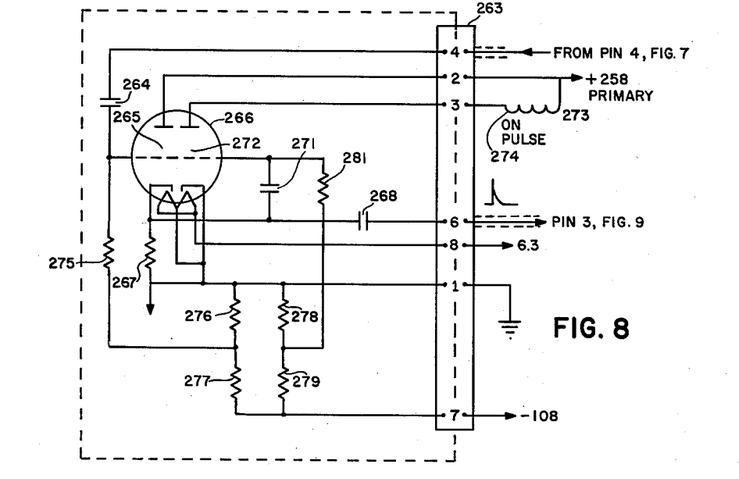
FIG. 8 is a schematic diagram of the cathode follower and pulse amplifier used in the control unit of FIG. 6.

The output of the P.R.F. generator, FIG. 7, triggers a cathode follower, FIG. 8. This output is taken between cathode and ground of the tube 251 to junction terminal 4 of a junction board 262. This output signal is then connected from terminal 4 of junction board 262 to terminal 4 of junction board 263, of the cathode follower and pulse amplifier, FIG. 8.

The cathode follower and pulse amplifier, FIG. 8, provides simultaneous outputs to the duration univibrator (FIG. 9) and the sequential switching unit (FIG. 14). The trigger signal is carried from terminal 4 of junction board 263 through a capacitor 264 to the grid of one section 265 of a dual triode 266. The cathode follower section 265 is primarily an isolation circuit between the P.R.F. generator and other triggered circuits and provides a low impedance pulse source. A positive trigger applied to the grid of triode section 265 will appear as a positive trigger across the cathode resistor 267 of the triode. This trigger is coupled from the cathode of the triode section 265 through a capacitor 268 to terminal 6 of the junction board 263, to actuate the duration univibrator, FIG. 9. This same trigger present across resistor 267 is also coupled through a capacitor 271 to the grid of the other triode section 272 of the dual triode 266, where it is amplified and inverted to produce a heavy current pulse across the primary 273 of a transformer 274. The voltage induced in the secondary winding of transformer 274 is the On pulse which actuates the circuitry of the sequential switching unit.

The grid of section 265 of dual triode 266 is connected through a resistor 275 to the common junction of a voltage divider consisting of resistors 276 and 277. A negative voltage is applied to one end of resistor 277 which is connected in series with resistor 276 to act as a negative bias supply. The negative bias applied to the grid of section 265 provides sufficient bias to keep that triode non-conducting until a suitable trigger is received. The other triode section 272 is similarly biased to cut-off by a voltage obtained from the junction point of series connected resistors 278 and 279. A negative source voltage is applied across this voltage divider. The bias voltage is applied through a resistor 281 to the grid of section 272.

Figure 9:
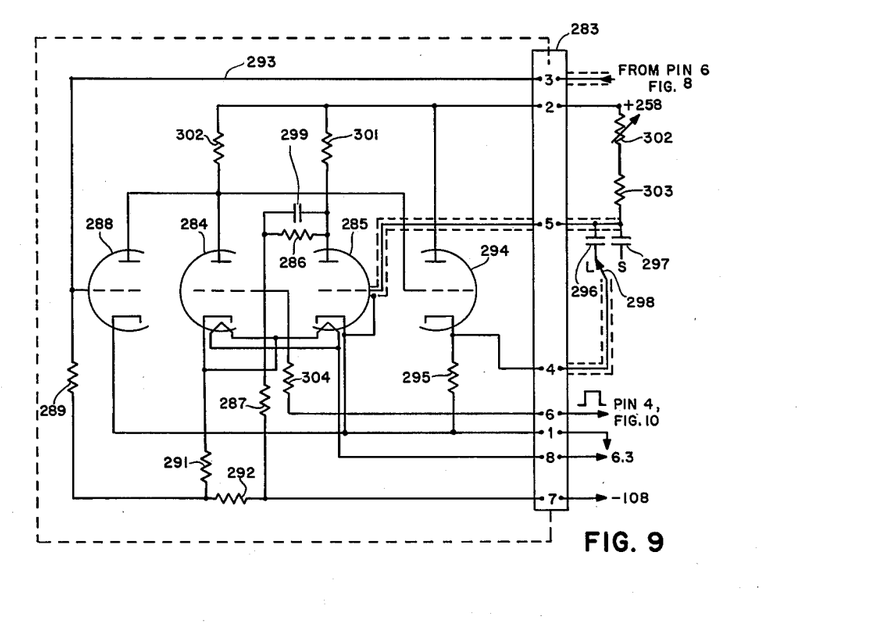
FIG. 9 is a schematic diagram of the duration univibrator used in the control unit of FIG. 6.

The output appearing at terminal 6 of junction board 263 is connected to pin 3 of a junction board 283, FIG. 9. The duration univibrator, FIG. 9, is a multivibrator having the length of the firing interval controllable. It is capable of producing a delayed trigger pulse. The multivibrator consists of sections 284 and 285, each of which is a triode. The control grid of tube section 284 is coupled through a resistor 286 to the plate of the tube section 285. This grid is also returned through a resistor 287 to a negative voltage source which holds tube section 284 well below cut-off until a positive trigger is applied to the grid of triode amplifier 288. The grid of triode 288 is connected through a resistor 289 to the junction point between two resistors 291 and 292. Resistor 292, in turn, is connected to a negative source voltage.

When a positive trigger is applied from pin 3 of junction board 283 through a conductor 293 to the grid of triode 288, it is inverted at the plate and directly coupled to the grid of a triode 294. Triode 294 is connected as a cathode follower. The negative pulse appearing across resistor 295 in the cathode of triode 294 is coupled through a capacitor 296 or a capacitor 297, to the grid of triode section 285 of the multivibrator. Capacitors 296 and 297 have one side commonly connected to terminal 5 of junction board 283 and the other side connected to the respective contacts of a two position switch 298, the input to which is the signal appearing across the resistor 295. A negative input to the grid of triode section 285 will cause the plate voltage of that tube to rise, which in turn raises the grid of triode section 284 above its cut-off voltage. The signal from the plate of triode section 285 to the grid of triode section 284 is coupled for the purpose of obtaining a short rise time square wave through a capacitor 299 which is connected in parallel with the resistor 286. Resistor 301 is connected between the plate of triode 285 and the plate supply voltage and in addition to being the plate voltage dropping resistor also acts as a section of a voltage divider consisting of resistors 286, 287 and 301 between a negative source voltage and the plate supply voltage. The plate of triode 284 is connected through a resistor 302 to the plate supply voltage. The plates of triode sections 284 and 288 are connected together as are the cathodes of triode sections 284, 285 and 288. The lengths of the conducting interval of triode section 284 is determined by the setting of a variable resistor 302 which is connected in series with a resistor 303 between the grid of triode section 285 and the plate supply voltage. This variable resistor therefore adjusts the bias voltage at the grid of triode 285. The length of conduction of triode 284 is also determined by the choice of coupling condensors 296 and 297. Triode 284 will continue to conduct until the grid of triode 285 reaches cut-off. The resulting output is transmitted through a resistor 304 connected between the grid of triode 284 and terminal 6 of junction board 283 to the pulse amplifiers, one of which is shown in FIG. 10. It should be noted that triode 294 is connected as a cathode follower between the plate of triode 284 and the coupling capacitors 296 or 297, which permits a rapid recharging of capacitors 296 or 297 when the cathode follower grid potential is suddenly raised at the end of a firing period. With this arrangement the duty cycle can be increased to approximately 0.95.

The square wave output from the duration univibrator (FIG. 9) is taken from terminal 6 of junction board 283 to terminal 4 of junction board 306 of a pulse amplifier (FIG. 10). The pulse amplifier, FIG. 10, amplifies and differentiates the square wave output of the delay univibrator to provide to the delay univibrator (FIG. 11) a sharp trigger pulse which coincides with the trailing edge of the square wave pulse input to the pulse amplifier, FIG.

10. The input pulse to the pulse amplifier, FIG. 10, is taken from terminal 4 of junction board 306 to the control grid of triode section 307. The pulse amplifier, FIG. 10, also has a second triode section 308. Both triode sections 307 and 308 are normally biased below cutoff. This biasing voltage is provided to triode section 307 through the input lead from the delay univibrator. The biasing voltage for the triode section 308 is provided from a voltage divider consisting of resistors 309 and 311, which are connected between a negative source voltage appearing at terminal 7 of junction board 306 and ground, at terminal 1 of junction board 306. The negative biasing of approximately 50-volts is taken from the junction of resistors 309 and 311 through the resistor 312 to the control grid of triode section 308. When the square wave input appears at the control grid of triode section 307, the leading edge of that pulse produces a negative pulse at the plate of that triode. This negative pulse is coupled through a capacitor 313 to the control grid of triode section 308, but since triode section 308 is normally below cutoff, plate current does not flow at this instance.

When the trailing edge of this square wave appears at the control grid of triode section 307 the plate voltage suddenly rises, coupling a sharp positive trigger through capacitor 313 to the control grid of triode section 308. Triode section 308 now conducts and produces a heavy current pulse in the primary winding 314 of the output transformer 315. The voltage induced in the secondary winding of transformer 315 is the pulse which triggers the firing circuit of the OFF ignition. The primary winding 314 is connected at one end to the plate of triode section 308 and at its other end through a resistor 316 to the plate of triode section 307. The cathodes of triode sections 307 and 308 are connected to ground through terminal 1 of junction board 306. The negative going square wave pulse, which is the amplified input signal, is connected from the plate of triode section 307 through pin 6 of junction board 306 to pin 3 of the junction board 317 of the delay univibrator, FIG. 11, providing an OFF pulse input to the delay univibrator.

The delay univibrator, FIG. 11, is a one shot cathode coupled multivibrator capable of inducing a delay of three to eight milliseconds between the input trigger pulse appearing at pin 3 of junction board 317 and the output trigger pulse appearing at pin 6 of junction board 317. The input pulse appearing at terminal 3 of junction board 317 is coupled through a capacitor 318 to the control grid of triode section 319. The control grid of triode section 319 is connected through a resistor 321 to the juncture point between two series connected resistors 322 and 323. Resistor 322 is connected at one end to ground while resistor 323 is connected to a negative supply voltage. Resistors 322 and 323 thus provide a biasing voltage at their juncture point to the control grid of triode section 319. The trigger output from triode section 319 is taken from the plate which is connected to the plate of a triode section 324. Triode section 324, together with a triode section 325, are connected as a one shot multivibrator. The plate of triode section 324 is connected through a capacitor 326 to the control grid of triode section 325. The plate of triode section 324 is connected to a B+ supply of voltage through a resistor 327 and the plate of triode section 325 is connected to the B+ supply voltage through a resistor 328. The control grid of triode section 325 is connected through a resistor 329 to the B+ supply voltage. The B+ supply voltage appears at terminal 2 of junction board 317. The cathodes of triode sections 324 and 325 are connected through a common resistor 331 to ground. The output from the multivibrator is taken from the plate of triode section 325 through a capacitor 332 to the control grid of a triode section 333. The control grid of triode 333 is connected to the B+ supply voltage source through a resistor 334. The cathode of triode section 333 is connected to ground. The plate of section 333 is connected to the B+ supply voltage through a resistor 335. The output from triode section 333 is taken through a capacitor 336 is terminal 6 of junction board 317. The positive, peaked output signal from terminal 6 of junction board 317 is applied to pin 3 of a junction board 341 of a gate univibrator, FIG. 12. A positive bias voltage for the control grid of triode section 324 can be set by adjusting the movable arm of a potentiometer 337. Potentiometer 337 is connected in series with resistors 338 and 339. The series connected resistors 338, 339 and potentiometer 337, are connected between the B+ supply voltage and ground.

A capacitor 326 provides coupling between the plate of triode section 324 and the control grid of triode section 325. The coupling between the plate of triode section 325 and the control grid of triode section 325 is provided by common cathode resistor 321. In the absence of trigger pulses, triode section 325, which has a positive grid return, conducts and raises the cathode voltage of triode sections 324 and 325. The grid bias of triode section 324 is adjusted to a low enough value by adjusting potentiometer 337 to make the cathode positive with respect to the grid, thus keeping triode section 324 cutoff. When a negative square wave from the pulse amplifier is applied to the grid of triode section 319 this square wave is converted to alternately negative and positive pulses by the differentiation action of capacitor 318 and resistor 321. The positive going pulse which occurs at the same time as the off pulse is applied to the grid of the normally nonconducting triode section 319. Plate current will flow and a negative trigger is coupled through capacitor 326 to the grid of triode section 325. If this negative trigger is sufficient to cause cutoff of triode section 325 the common cathode potential of triode sections 324 and 325 are dropped suddenly and the plate current flow will be switched to triode section 324. Triode section 324 will continue to conduct until capacitor 326 has discharged sufficiently to bring the grid of triode 325 to cutoff. At this point the second switching occurs. Triode section 325 will conduct suddenly, producing a negative trigger to the plate of triode 333. The length of the firing period of triode section 324 is adjusted by potentiometer 337 and determines the delay period between input and output triggers. The R.C. circuit, composed of capacitor 332 and resistor 334, is a differentiation network which converts the change in D.C. level appearing at the plate of triode section 325 to alternately positive and negative pulses at the grid of triode section 333. Since triode section 333 is normally conducting heavily, no output will occur until a negative pulse is presented at its grid. The positive trigger appearing at the grid of triode section 333, when the plate current is switched from triode section 325 to triode section 324, has no effect on the plate current of triode section 333.

The output of the delay univibrator is taken from pin 6 of junction board 317 (FIG. 11) to pin 3 of junction board 341 of the gate univibrator (FIG. 12). The gate univibrator of FIG. 12 is substantially the same as the duration univibrator of FIG. 9, with certain minor exceptions which involve the arrangement of the external capacitor connected between terminals 4 and 5 of junction board 341 and 283, respectively. In the case of the circuit of FIG. 12, a single fixed capacitor is used while a choice of two capacitors 296 and 297 is available in the duration univibrator of FIG. 9. In view of the substantial equivalents of FIGS. 9 and 12, only a description of FIG. 12 will be given. The input to terminal 3 of junction board 341, FIG. 12, is applied to the control grid of triode section 342. A resistor 343 is connected from the grid of triode section 342 to the common junction point between two series connected resistors 344 and 345. One end of resistor 344 is connected to ground and one end of resistor 345 is connected to the negative supply voltage. A bias voltage is thus provided from the common juncture point of resistor 344 and 345 through resistor 343 to the control grid of triode section 343. The one shot multivibrator consists of two triode sections 346 and 347 and associated circuity. The plates of triode sections 342 and 346 are connected through a resistor 348 to a B+ supply voltage source. These plates are also connected to the control grid of triode section 349. The cathodes of triode sections 342, 346 and 347 are connected to ground. The control grid of triode section 346 is returned through resistor 351 to a negative voltage source. This control grid is also connected through the capacitor 352 and a resistor 353 to the plate of triode section 347. The plate of triode section 347 is connected through a resistor 354 to the positive B+ supply voltage. This positive B+ supply voltage appears at terminal 2 of junction board 341. The positive square wave output from the multivibrator is taken from the control grid of triode section 346 through the resistor 355 and terminal 6 of junction board 341 to the control grid of the cathode follower circuit, FIG. 13. The resistor 356 is connected at one end to the positive B+ supply voltage and at its other end to a variable resistor 357. Variable resistor 357 is in turn connected to the control grid of triode section 347. A capacitor 358 is connected between the control grid of triode 347 and the cathode of triode section 349. The cathode of triode section 349 is returned to ground through a resistor 350. The plate of triode 349 is connected to a positive B+ supply voltage. Since the operation of the duration univibrator of FIG. 9 has been described in detail, such a description will not be repeated for the gate univibrator of FIG. 12. It should be noted though that the components of capacitor 358, resistor 356, and variable resistor 357 have been selected in the preferred embodiment to permit the gate duration of from 15 to 25 milliseconds. Since this range can be obtained by adjusting the variable resistor 357, capacitor 358 is a single fixed capacitor whereas in the duration univibrator of FIG. 9 it was necessary to make available an alternative selection of two capacitors 296 and 297 to obtain the desired range of operation.

Figure 22:
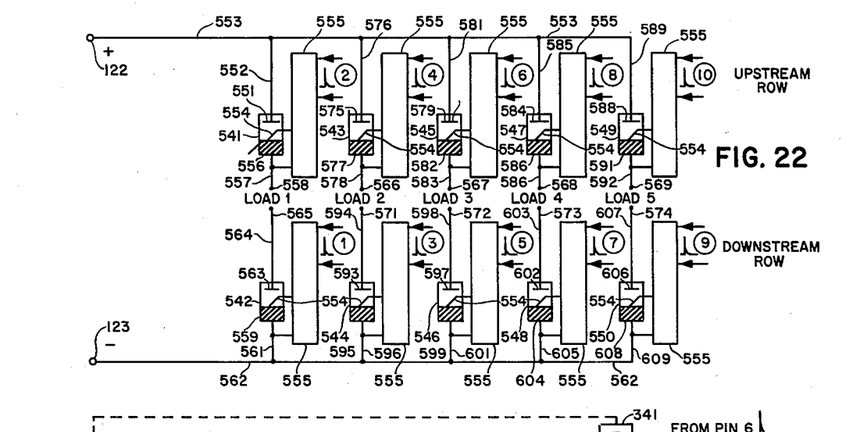
FIG. 22 is a block diagram of a sequential switching unit for a multiple-of-five field array.

The cathode follower circuit of FIG. 13 is a conventional cathode follower used to isolate the gating output of the gate univibrator of FIG. 12 from the grids of the C6J condenser charging rectifiers of FIGS. 1, 4 and 22. A resistor 361 is connected between the cathode of one triode section 362 of the cathode follower and a negative supply voltage. The resistor 363 is connected between the cathode of triode section 364 of the cathode follower circuit and the negative supply voltage. The plates of the two triode sections of the cathode follower circuit are connected together to a positive B+ voltage source. By returning the cathode resistors 361 and 363 to a negative supply voltage, in the preferred embodiment minus 108 volts, the C6J rectifiers are kept from conducting until the change in D.C. level from the gate univibrator, FIG. 12, is applied to the grids of the cathode follower circuit, FIG. 13. The gate outputs taken from the cathode of the triode sections 362 and 364 are fed to the already mentioned rectifier grids.

The sequential switching unit circuit of FIG. 14 receives the On and Off pulses from the control unit and provides output pulses to the ignitron firing circuits. The sequential switching unit, FIG. 14, consists of four basic units: cathode-anode followers (FIG. 15), scale of two dividers (FIGS. 16 and 18), gates (FIGS 17 and 19), and pulse amplifiers (FIG. 20). The output pulses of the sequential switching unit, FIG. 14, are taken from the secondaries of output transformers and applied to the ignitron firing circuits in the sequence illustrated in FIG. 3 where the ignitron numbers correspond to those appearing adjacent the secondary windings of the output transformers (FIG. 14). Before describing the operation of the sequential switching unit, there will be given a circuit description of the four basic components used in the sequential switching unit.

Figure 15:
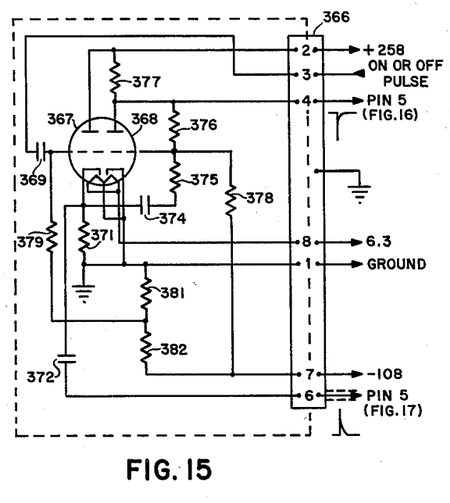
FIG. 15 is a schematic diagram of a cathode-anode follower circuit used in the sequential switching unit of FIG. 14.

The cathode-anode follower is shown in detail in FIG. 15. Both positive and negative triggers are required to actuate the various scale of two dividers and gate units. These are provided through the cathode-anode follower circuit of FIG. 15, which is a conventional cathode follower circuit used to isolate the load from its source. When triggered, the output of the cathode-anode follower, appearing at terminal 6 of junction board 366, a positive trigger pulse, is applied to terminal 5 of the various gates represented by the gate of FIG. 17.

The cathode-anode follower circuit, FIG. 15, consists of two triode sections 367 and 368. The input pulse which is the On or Off pulse is taken from terminal 3 of junction board 366 through a capacitor 369 to the control grid of triode section 367. The plate of triode section 367 is connected to the B+ supply voltage through terminal 2 of junction board 366. The cathode of triode section 367 is returned to ground through a resistor 371. One output, which is the positive pulse output, is taken from the cathode of triode section 367 through a capacitor 372 to terminal 6 of junction board 366. The peaked positive pulse appearing at this terminal is applied to pin 5 of the various gates A and gates B used in the sequential switching unit. In the preferred embodiment this pulse is applied to terminal 5 of junction board 373, FIG. 17. Another output from triode section 367 is taken through a capacitor 374 and a resistor 375 to the control grid of triode section 368. A resistor 376 connected between the control grid and plate of triode section 368 provides degenerative feedback so as to obtain a 1:1 voltage ratio from the input to the output. The output from triode section 368 is taken from the plate of that triode to terminal 4 of junction board 366, providing a negative peaked pulse to the scale of two dividers of the sequential switching unit, FIG. 14. The plate of triode section 368 is connected through a resistor 377 to the positive B+ supply voltage. The control grid of triode 368 is biased to a negative potential by connecting a bias supply voltage through a resistor 378 to that control grid. The control grid of triode section 367 is similarly negatively biased by having the grid of triode section 367 connected through a resistor 379 to the common juncture of two resistors 381 and 382 connected in series as a voltage divider between ground and a negative source voltage.

Since they are identical in circuity except for their input and output connections the scale of two A and scale of two B dividers of FIGS. 16 and 18 will be described together and like numerals will designate like components in these two figures. The scale of two dividers are bistable multivibrators capable of being transferred from one stable state to another by the application of suitable triggering impulses to the triggering diodes. Two triode sections 383 and 384 and their associated circuity make up the two dividers and bistable multivibrators. The plate of triode section 383 is returned through a resistor 385 to the B+ supply voltage. The plate of triode section 384 is returned through a resistor 386 to the B+ supply voltage. The control grid of triode section 383 is connected through a capacitor 387 and resistor 388 to the plate of triode section 384. The control grid of triode section 384 is connected through parallel connected capacitor 389 and resistor 391 to the plate of triode section 383. The control grid of triode section 384 is connected through a resistor 392 to a negative source voltage at terminal 7 of a junction board 393. The control grid of triode section 383 is similarly returned through a resistor 394 to the negative supply voltage appearing at terminal 7 of junction board 393. A diode 395 has its plate connected to the plate of triode section 383 and its cathode connected through a resistor 396 to the B+ supply voltage appearing at terminal 2 of junction board 393. A diode 397 has its plate connected to the plate of triode section 384 and its cathode connected through a resistor 398 to the B+ supply voltage. A neon indicator lamp is connected to terminal 3 and a resistor 399 to the plate of triode section 384. The cathodes of triode sections 383 and 384 are connected to ground. The cathode of diode 397 is connected to terminal 4 of junction board 393. The negative trigger from the appropriate gates A or B is applied to terminal 4 of junction board 393 and through the diode 397 to trigger the bistable multivibrators. The cathode of diode 395 is connected through a capacitor 401 to terminal 5 of junction board 393.

A negative On pulse trigger is applied through terminal 5 of junction board 393, capacitor 401 and diode 395 to trigger the bistable multivibrators. The control grid of triode section 384 is connected through a resistor 402 to terminal 6 of junction board 393, providing an output to terminal 7 of the gates (FIG. 17). In view of the well known operation of bistable multivibrators of the type illustrated in FIGS. 16 and 18 their flip-flop action and operation will not be discussed in detail.

Figure 19:
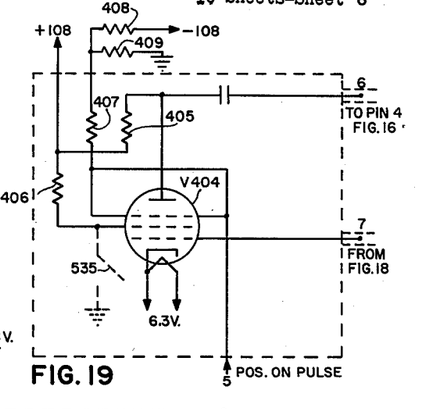
FIG. 19 is a schematic diagram of a gate B used in the sequential switching unit of FIG. 14.
Figure 20:
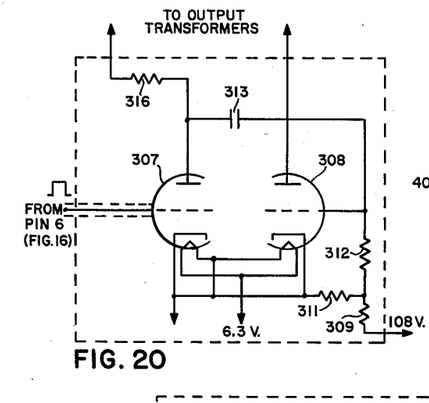
FIG. 20 is a schematic diagram of a pulse amplifier used in the sequential switching unit of FIG. 14.

The gates A and B in the sequential switching unit, FIG. 14, are illustrated in FIG. 17 and FIG. 19. These gates utilize a pentode 403 with two control grids. In describing the gates of FIGS. 17 and 19 like numerals will indicate like parts in these gates which, except for their output connections are identical in circuity and operation.

The plate of the pentode is connected through a capacitor 404 to terminal 6 of junction board 373. The output signals of the gates are carried from this terminal to the scale of 2 dividers through terminal 4, FIGS. 16 and 18. A resistor 405 is connected from the plate of tube 403 to the B+ supply voltage at terminal 2 of junction board 373. The B+ voltage is supplied from this same voltage source through a resistor 406. The input to grid No. 1 comes from terminal 6 of the scale of two dividers (FIGS. 16 and 18) and is carried from terminal 7 of junction board 373 to the first control grid. The second grid of pentode 403 is normally the suppressor grid of the pentode and utilized as a control grid in this instance. A positive On pulse is applied to this second control grid to terminal 5 of junction board 373. The second control grid is biased to a negative voltage through a resistor 407 connected at one end to the second control grid and at the other end to terminal 3 of junction board 373. Two dividers 408 and 409 connected in series between a negative source voltage and ground have their common juncture connected to terminal 3 of junction board 373. The cathode of pentode 403 is connected to ground.

In operation the control grid is held well below cutoff until a positive square wave is received from the associated scale of two dividers provided. This places the tubes in a condition so that any positive pulse of sufficient amplitude applied to the suppressor grid, control grid 2, will effect plate current flow. The negative potential applied to the suppressor grid is sufficient to block the tube even though the control grid is raised above cutoff by the application of a square wave to control grid No. 1. The output is a negative pulse which is carried to the scale of two divider associated with the particular gate.

FIGURE 20 shows the pulse amplifier used in the sequential switching unit, FIG. 14. It is substantially the same as the pulse amplifier shown in FIG. 10, except that its output and input connections vary slightly in that the connection from terminal 6 of the pulse amplifier of FIG. 10 to terminal 3 of FIG. 11 is not required. For simplicity, reference numbers identical to those used in connection with the pulse amplifier of FIG. 10 are applied to the pulse amplifier of FIG. 20 and reference is had to the description of the pulse amplifier of FIG. 10 as applicable to the amplifier of FIG. 20.

The sequential switching unit of FIG. 14 receives On and Off pulses from the control unit and provides for the sequential firing of the ignitrons shown in FIG. 3, which is a duplicated 4-field array of electrodes. In describing FIG. 14 the terms "left" and "right" will be used in connection with the scale of two dividers of FIGS. 16 and 18. If triode section 383 of FIGS. 16 and 18 is conducting the scale of two dividers will be termed as having been switched to the left. If triode section 384 of FIGS. 16 and 18 is conducting the scale of two dividers of FIGS. 16 and 18 will be termed as having been switched to the right. When a particular scale of two divider has been switched to the right a voltage rise will be coupled through resistor 402 to the control grid of its associated gate which overcomes the bias and opens the gate, causing the gate to conduct. Simultaneously, this voltage rise or square wave is applied to the grid of the associated pulse amplifiers, FIG. 20. The term "closed" as applied to the various gates means that the tubes are biased below cutoff.

In FIG. 14, positive On pulses are supplied from the control unit pulse amplifier 234 (FIGS. 6 and 8) to a cathode follower 405 (FIG. 15). One output from the cathode follower is taken through a signal conductor 406 to an anode follower 407, which anode follower 407 is a part of the cathode-anode follower of FIG. 15. Another output from this cathode-anode follower is taken through a signal conductor 408, a switch contact 409, a signal conductor 411 and respective conductors 412, 413, 414 and 415 to the respective gates B 416, 417, 418 and 419. This output from the cathode follower is taken from terminal 6 of junction board 306, FIG. 15, to terminal 5 of the several gates 416 to 419, inclusive. The negative pulse output from the anode follower 407 (terminal 4, junction board 366, FIG. 15), is taken through signal conductor 421 to a capacitor 422. The capacitor 422 is connected to a signal conductor 423 and respective signal conductors 424, 425, 426 and 427 to respective scale of two dividers 428, 429, 431 and 432 (FIG. 15). A rectifier 433 is connected between ground and signal conductor 423. Capacitor 422 and rectifier 433 act as a pulse inverter for the signal from the anode follower. One output from the scale of two A dividers 428 to 432, inclusive, is taken from terminal 6 of junction board 393 (FIG. 16) through respective conductors 434, 435, 436 and 437 and respective conductors 438, 439, 441 and 442 to respective gates A 443, 444, 445 and 446.

Another output from scale of two divider 428 is taken through conductor 434 and conductors 447, 448 and 449 to respective pulse amplifiers 451 and 452. The output from pulse amplifier 451 is applied to the primary winding 453 of transformer 454. The pulse transformer 454 has two secondary windings 455 and 456 which respectively energize the firing circuits for ignitrons 111 and 112 (FIG. 3). The output from pulse amplifier 452 is applied to the primary winding 457 of a transformer 458. The transformer 458 has a secondary winding 459 which is connected to the firing circuit for ignitron 119.

Another output from the scale of two A divider 429 is taken through conductor 435 and a conductor 461 to a pulse amplifier 462. The output from pulse amplifier 462 is applied to the primary winding 463 of a pulse transformer 464. Two secondary windings 465 and 466 respectively provide the energizing pulses for the firing circuits of ignitrons 113 and 114 (FIG. 3). Another output from scale of two A divider 431 is taken through conductor 436 and conductor 467 to a pulse amplifier 468. The output from pulse amplifier 468 is connected to the primary winding 469 of a pulse transformer 471. The pulse transformer 471 has two secondary windings 472 and 473 which respectively provide the energizing pulses for the firing circuits of ignitrons 115 and 116.

Another output from scale of two A divider 432 is taken through conductor 437 and conductors 474 and 475 to a pulse amplifier 476. The output from pulse amplifier 476 is supplied to the primary winding 477 of a pulse transformer 478. Two secondary windings 479 and 481, respectively, provide the energizing pulses for the firing circuits for ignitrons 117 and 118. Another output from scale of two A divider 432 is taken through conductors 437, 474 and a conductor 482 to a pulse amplifier 483. The output from pulse amplifier 483 is applied to the primary winding 484 of a pulse transformer 485. The secondary winding 486 of pulse transformer 485 provides the energizing pulse for the firing circuit of ignitron 120.

The circuit details of pulse amplifiers 451, 452, 468, 476 and 483 are shown in FIG. 20. The circuit details of the scale of two A dividers 428, 429, 431 and 432 are shown in the circuit schematic of FIG. 16.

Figure 16:
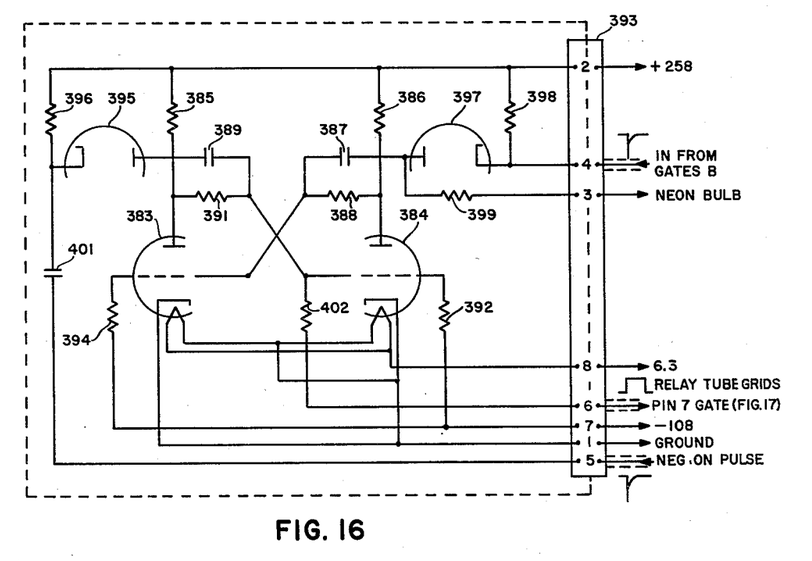
FIG. 16 is a scale of two A divider multivibrator used in the sequential switching unit of FIG. 14.
Figure 17:
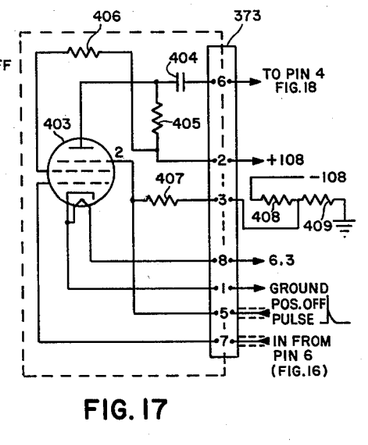
FIG. 17 is a schematic diagram of a gate A used in the sequential switching unit of FIG. 14.

To indicate the state of the left and right triode of the divider of FIG. 16 neon bulbs 487 are connected through conductors 488 to terminal 3 of junction board 393, FIG. 16.

A second cathode follower 491 has as its input the Off pulses taken from between terminals 2 and 5 of junction board 306, FIG. 10. One output from cathode follower 491 is fed through a conductor 492 to an anode follower 493. This anode follower 493 is a part of the cathode-anode follower of FIG. 15. Another output from the cathode follower 491 is taken through a conductor 494, a switching contact 495, a conductor 496 and respective conductors 497, 498, 499 and 501 to respective gates A 502, 503, 504 and 505 (Terminal 5, junction board 373, FIG. 17).

The respective outputs from gates A 443 to 446, inclusive, are fed through respective conductors 506, 507, 508 and 509 to scale of two B dividers 511, 512, 513 and 514, respectively. The inputs to scale two B dividers 511 to 514, inclusive, are those applied to terminal 4 of the FIG. 18 dividers. Each of the dividers 511 to 514, inclusive, is identical to the one shown in detail in FIG. 18. The output from the anode follower 493 is taken through a conductor 515 to a capacitor 516. The capacitor 516 is connected through a conductor 517 and respective conductors 518, 519, 520 and 521 to the scale of two B dividers 511, 512, 513 and 514, respectively. These inputs to the scale of two B dividers 511 to 514, inclusive, are those applied to terminal 5 of FIG. 18. The outputs from scale two B dividers 511 to 514, inclusive, are taken through respective conductors 522, 523, 524 and 525 to gates B 416, 417, 418 and 419, respectively. These outputs are the inputs applied to terminal 7 of the gates B, FIG. 19.

A rectifier 526 is connected between conductor 517 and ground. A capacitor 516 together with rectifier 526 inverts the output of the anode follower 493.

Figure 18:
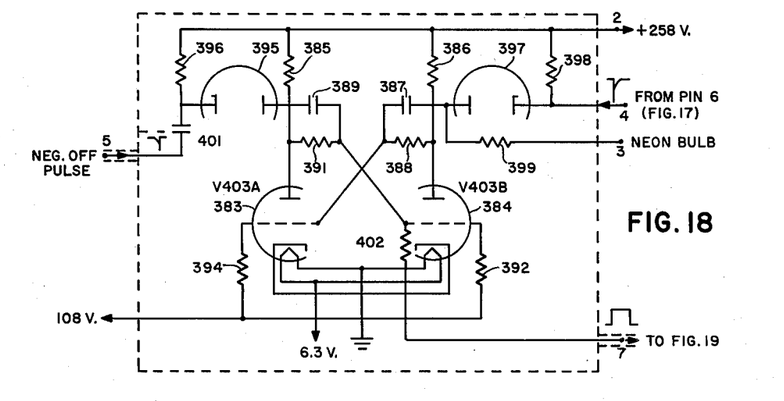
FIG. 18 is a scale of two B divider multivibrator used in the sequential switching unit of FIG. 14.

Neon bulbs 527 are connected by a conductor 528 to the scale of two B dividers 511, 512, 513 and 514 (terminal 3, FIG. 18). The output from gates B 416, 417, 418 and 419 (terminal 6, FIG. 19) are fed through respective conductors 529, 531, 533 and 534 to scale of two A dividers 429, 431, 432 and 428, respectively.

In operation it is first necessary to assure that all of the scale of two dividers are switched to the left. This is accomplished by disconnecting the two positive triggers from the cathode followers to the gates by opening switches 409 and 495. When switches 409 and 495 are closed and the two positive triggers again connected to the gates 416, 417, 418, 419, 502, 504, and 505 all the scale of two dividers will have been switched to the left so that all gates are closed and the application of positive pulses to the respective suppressor grids of the gates will not effect a plate current flow. In order to initiate sequential action of the sequential switching unit it is necessary to open (cause conduction) through one of the gates. This is accomplished by momentarily removing the bias from the gate 419 so that the positive pulses applied to its suppressor grid will produce an output which will switch the scale of two A divider 428 to the right. The bias on gate 419 is momentarily removed by closing a small spring loaded switch 535 connected between the control grid of gate B 419 (control grid of gate B, FIG. 19, to ground). This switch 535 is shown in dotted lines in FIG. 19 but is only used in connection with gate B 419.

When gate 419 is momentarily opened the first positive On pulse applied to the suppressor grid of gate 419 provides an inverted output and is applied to the scale of two A divider 428 causing three simultaneous circuit changes. Scale of two A divider 428 is switched to the right and opens gate 443. It also applies a positive square wave to pulse amplifier 451 and 452 through conductors 434, 447 and respective conductors 448 and 449. It should be noted that no output from the pulse amplifiers 451 and 452 is produced until the trailing edge of the square wave output of the scale of two A divider 428 is present in the output of the pulse amplifiers.

Since gate 443 has now been opened, the first positive Off pulse received by that gate is now passed through in inverted form and applied to the scale of two B divider 511. This switches the scale of two B divider 511 to the right and in turn opens gate B 416.

The second positive On pulse received by gate 416 which is now in an open condition, is inverted and applied to the scale of two A divider 429. The scale of two A divider 429 is switched to the right, opening gate 444. It also applies a positive square wave to its associated pulse amplifier 462. At the same time a negative On pulse is applied to the scale of two A divider 428, switching it to the left and closing gate 443. This also removes the square wave from the associated pulse amplifiers 451 and 452 and the negative going trailing edge of that square wave is inverted and amplified by the pulse amplifiers 451 and 452. This produces the positive current pulse which triggers the firing circuits of the associated ignitrons 111, 112 and 119.

Since gate 444 is now open, the second positive Off pulse received by gate 444 is inverted by this gate and applied to the scale of two B divider 512, switching this divider to the right and opening gate B 417. The second negative Off pulse received by scale two B divider 511 switches this divider to the left and closes gate B 416.

The third positive On pulse received by gate 417 is inverted by this gate and applied to the scale of two A divider 431, causing three simultaneous circuit charges. Scale of two A divider 431 is switched to the right which opens gate A 445 and applies a positive square wave to the associated pulse amplifier 468. At the same instant a negative On pulse is applied to a scale of two A divider 429 switching this divider to the left and closing gate 444. This also removes the square wave from the associated pulse amplifier 462 and the negative going trailing edge of the square wave is inverted and amplified, producing positive current pulse which trigger the firing circuits of the associated ignitrons 113 and 114.

The sequence of events just described continues until gate B 419 is opened. When a positive Off pulse is applied to gate B 419, the entire sequence of events is repeated and continues as long as the triggered pulses are received from the control unit.

The ignitor firing circuits are identical for all ignitrons. The cycle of operation can be followed in FIG. 4. Firing capacitor 181 is charged through the thyratron 183 and charging resistor 182. A phase-advance network composed of capacitor 185 and resistors 184 and 187 insures that the tube fires very early during the first positive half cycle. This reduces transient surges. The firing thyratron 188 is biased to a high negative value by the power supply consisting of transformer 189, rectifier 194, resistors 191 and 192 and capicator 193. Resistor 196 serves to limit grid current flow while resistor 195 is the input load across which the trigger pulse is applied. The trigger pulse peak voltage exceeds the bias and is of opposite polarity so the thyratron 188 is allowed to conduct. The firing capacitor 181 discharges through the ignitron 32, resistor 197 and thyratron 188. The resulting arc between the ignitron 48 and the mercury cathode pool ionizes the mercury vapor and since the anode 36 is positive the ignitron conducts. Resistor 197 limits the peak anode current of the thyratron 188 to values below the rated maximum. The transformer 189 can be a small filament transformer with its low voltage winding connected to the thyratron filament transformer and the original primary winding used as secondary winding.

Figure 21:
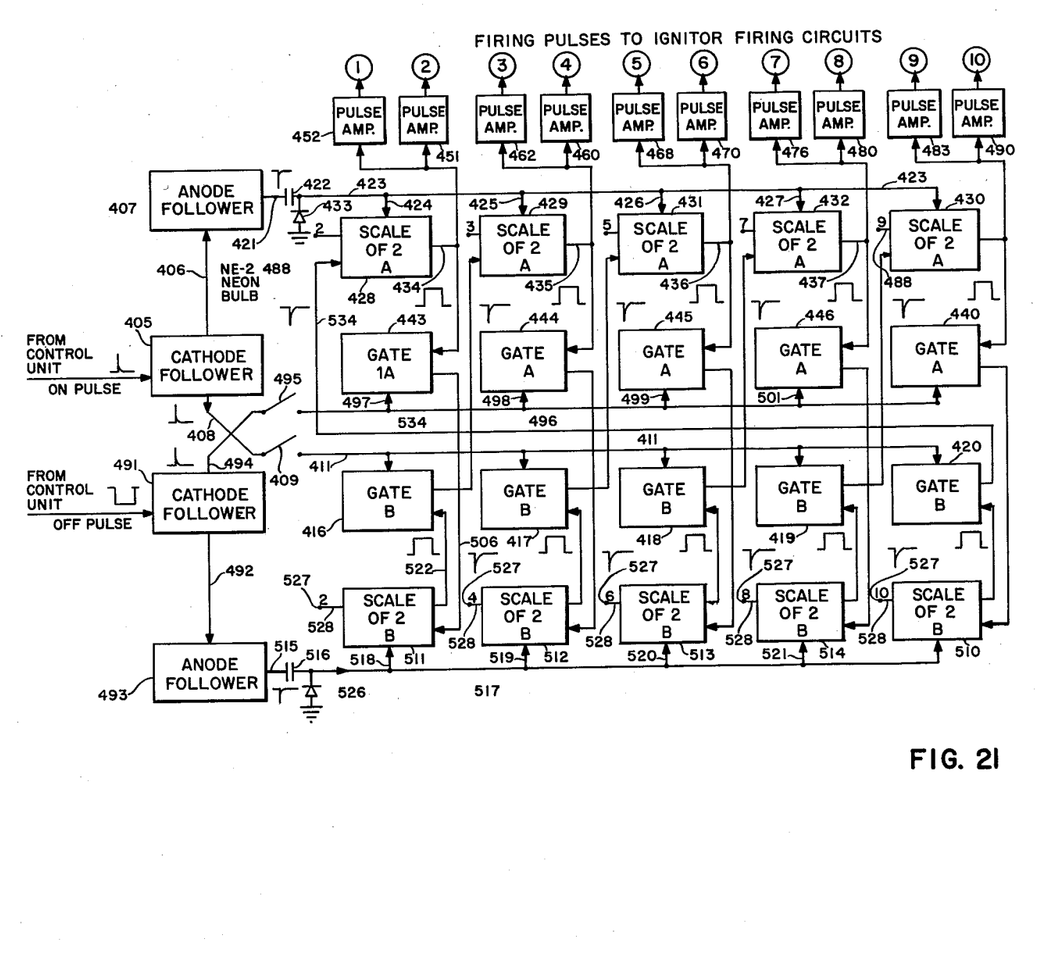
FIG. 21 is a schematic diagram showing the arrangement of the electrode control devices for a multiple-of-five field array.

FIG. 21 shows a sequential switching unit for a multiple-of-five field array. This allows for 10 ignitrons to be used, increasing the coverage by 25% as compared to the duplicate four field array with single polarity end electrodes of FIG. 3. In the multiple of five field array the end areas can be neglected because of the length of the electrode array, making the use of single polarity end electrodes unnecessary.

The description including the operation of the sequential switching unit of FIG. 14 which has just been described is applicable to the sequential switching unit of FIG. 21 where the same numerals identify similar parts. It should be noted though that the sequence of events described in connection with FIG. 14 continues until gate 420 is opened. When a positive Off pulse is applied to gate B 420 the entire sequence of events is repeated and continues as long as trigger pulses are received from the control unit. As is to be expected, FIG. 21 has an additional scale of two A divider 430, gate A 440, and scale of two B divider 510.

Four additional pulse amplifiers 460, 470, 480 and 490 are provided to feed the multiple-of-five firing pulse sequence to the ignitor firing circuits.

For a multiple-of-five field configuration the electrode and ignitron arrangement of FIG. 22 is used. The firing sequence of the sequential switching unit of FIG. 21 which provides the firing pulses to the ignitor firing circuits shown in block diagram form in FIG. 22 is identified by encircled numerals 1 to 10 in both FIGS. 21 and 22. The 10 On tubes of FIG. 22, 541–550 inclusive, are connected at terminals 122 and 133 to the identically numbered terminals in FIG. 1 and in place of the control tubes 25 to 30, inclusive, shown there. Control ignitron 541 has a plate 551 connected through a conductor 552 to the positive bus 553. The control grid 554 is connected to an ignitor firing circuit 555. As previously mentioned all the ignitor firing circuits used in connection with ignitrons, such as ignitrons 541 to 550 inclusive, are identical and are shown in detail in FIG. 4. Cathode 556 of the ignitron 541 is connected through a conductor 557 to electrode 558.

The cathode 559 of ignitron 542 is connected through a conductor 561 to the negative bus 562. The plate 563 of the ignitron 542 is connected through a conductor 564 to the electrode 565. The load 1 indicated between electrodes 558 and 565 consists of water and earth between the physical location of these two electrodes. Ignitrons 541 and 542 are fired as a pair as evident from the fact that the pulse amplifiers 451 and 452 which provide the firing pulses for their ignitron firing circuits are initiated by the same scale of two A divider (FIG. 421). In their physical locations electrodes 558, 566, 567, 568 and 569 (FIG. 22) are located in an up-stream row while electrodes 565, 571, 573 and 574 are located in a down-stream row. Load 2 is the impedance between paired electrodes 566 and 573. Load 3 is the impedance between paired electrodes 567, 572. Load 4 is the impedance between paired electrodes 568 and 573. Load 5 is the impedance between the paired electrodes 569 and 574.

Ignitron 543 has its plate 575 connected through a conductor 576 to the positive bus 553. The cathode 577 of ignitron 543 is connected through a conductor 578 to electrode 566. Ignitron 544 has its plate 579 connected through a conductor 581 to the positive bus 553. The cathode 582 of ignitron 545 is connected through a conductor 583 to electrode 567. The plate 584 of ignitron 547 is connected through a conductor 585 to the positive bus 553. The cathode 586 of ignitron 547 is connected through a conductor 587 to electrode 568. The plate 588 of ignitron 549 is connected through a conductor 589 to the positive bus 553. The cathode 591 of ignitron 549 is connected through a conductor 592 to electrode 569.

The plate 593 of ignitron 544 is connected through a conductor 594 to electrode 571. The cathode 595 of ignitron 544 is connected through a conductor 596 to negative bus 562. The plate 597 of ignitron 546 is connected through a conductor 598 to electrode 572. The cathode 599 is connected through a conductor 601 to negative bus 562. The plate 602 of ignitron 548 is connected through a conductor 603 to electrode 573. The cathode 604 of ignitron 548 is connected through a conductor 605 to negative bus 562. The plate 606 of ignitron 550 is connected through a conductor 607 to electrode 574. The cathode 608 of ignitron 550 is connected through a conductor 609 to the negative bus 562.

The firing sequence of the paired ignitrons, using the encircled trigger numerals of FIG. 22 normally is 1, 2—, 4—5, 6, —7, 8—9, 10. After ignitrons 549 and 550 are fired by firing pulses 9, 10 the sequence is repeated cyclically with ignitrons 541 and 542. The Off ignitrons (FIG. 1), of course, cut off one pair of the On ignitrons of FIG. 22 before the next pair is fired. As each pair of ignitrons is fired by the energization of its firing circuit from the sequential switching unit (FIG. 21), current flows through the respective loads 1 to 5 inclusive. Due to the spacing, most of the flow will be between adjacent energized electrodes, such as 558 and 565. At the same time some current will also flow between other electrodes such as 565 and 573.

Although only three electrode arrangements and the firing sequences to be utilized with them have been described it should be understood that other electrode and firing arrangements are within the scope of this invention.

While there has been shown and described an invention in connection with certain specific embodiments, it will, of course, be understood that it is not intended nor is it wished to be limited thereto, since it is apparent that the principles herein disclosed are susceptible of numerous other applications and modifications may be made in the circuit arrangement and in the instrumentalities employed without departing from the spirit and scope of this invention as set forth in the appended claims.

What is claimed is:

1. A fish guidance direct current switching device comprising a plurality of electrodes arranged in paired relationship, D.C. generator means, a first control rectifier connected in series with a charging device, said charging device being dischargeable over a preselected period of time, said D.C. generator means being connected to said series connected first control rectifier and charging device, a D.C. source connected in series with a charging impedance for charging said charging device, a plurality of second control rectifiers, each one of said plurality of second control rectifiers being connected in series with one of said plurality of electrodes, said series connected first control rectifier and charging device being connected in parallel with said series connected second control rectifiers and electrodes, a control unit, a first output from said control unit for controlling the actuation of said first control rectifier, a second output from said control unit for gating the period of charging of said charging device, said charging period determining the total time for discharging said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs for triggering said plurality of second control rectifiers, said plurality of second control rectifiers when energized allowing current to flow from said D.C. generator means through the electrodes connected to said energized second control rectifiers, said period of current flow being terminated by the actuation of said first control rectifier.

2. A fish guidance direct current switching device comprising a plurality of loads, D.C. generator means, a first control rectifier connected in series with a charging device, said charging device being dischargeable over a preselected period of time, said D.C. generator means being connected to said series connected first control rectifier and charging device, a D.C. source connected in series with a charging impedance for charging said charging device, a plurality of second control rectifiers, each one of said plurality of second control rectifiers being connected in series with one of said plurality of loads, said series connected first control rectifier and charging device being connected in parallel with said series connected second control rectifiers and loads, a control unit, a first output from said control unit for controlling the actuation of said first control rectifier, a second output from said control unit for gating the period of charging of said charging device, said charging period determining the total time for discharging said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs, means for triggering said plurality of said control rectifiers, said triggering means being actuated by said sequenced firing pulse outputs, said plurality of second control rectifiers when energized allowing current to flow from said D.C. generator means through one of said loads connected to said energized second control rectifiers, said period of current flow being terminated by the actuation of said first control rectifier.

3. A direct current switching device comprising a plurality of loads, D.C. generator means, a first control rectifier connected in series with a charging device, said charging device being dischargeable over a preselected period of time, said D.C. generator means being connected to said series connected first control rectifier and charging device, a D.C. source connected in series with a charging impedance for charging said charging device, a plurality of second control rectifiers, each one of said plurality of second control rectifiers being connected in series with one of said plurality of loads, said series connected first control rectifier and charging device being connected in parallel with said series connected second control rectifiers and loads, a control unit, a first output from said control unit for controlling the actuation of said first control rectifier, a second output from said control unit for gating the period of charging of said charging device, said charging period determining the total time for discharging said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs, means for triggering said plurality of second control rectifiers, said control rectifier triggering means being actuated by said sequenced firing pulse outputs, said plurality of second control rectifiers when energized allowing current to flow from said D.C. generator means through one of said loads connected to said energized second control rectifiers, said period of current flow being terminated by the actuation of said first control rectifier.

4. A fish guidance direct current switching device comprising a plurality of electrodes arranged in paired relationship, D.C. generator means, a first control rectifier connected to a charging device, said charging device being dischargeable over a preselected period of time, said D.C. generator means being connected to said first control rectifier and said charging device, a D.C. source for charging said charging device, a plurality of second control rectifiers, each one of said plurality of second control rectifiers being connected to one of said plurality of electrodes, said first control rectifier and charging device being connected to said second control rectifiers and electrodes, a control unit, a first output from said control unit for controlling the actuation of said first control rectifier, a second output from said control unit for gating the period of charging of said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs for triggering said plurality of second control rectifiers, said plurality of second control rectifiers when energized allowing current to flow from said D.C. generator means through the electrodes connected to said energized second control rectifiers, said period of current flow being terminated by the actuation of said first control rectifier.

5. A direct current switching device comprising a plurality of electrodes, D.C. generator means, a first control rectifier connected to a charging device, said charging device being dischargeable over a preselected period of time, said D.C. generator means being connected to said first control rectifier and said charging device, a D.C. source for charging said charging device, a plurality of second control rectifiers, each one of said plurality of second control rectifiers being connected to one of said plurality of electrodes, said first control rectifier and charging device being connected to said second control rectifiers and electrodes, a control unit, a first output from said control unit for controlling the actuation of said first control rectifier, a second output from said control unit for gating the period of charging of said charging device, said charging period determining the total time for discharging said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs for energizing said plurality of second control rectifiers, said plurality of second control rectifiers when energized allowing current to flow from said D.C. generator means through the electrodes connected to said energized second control rectifiers, said period of current flow being terminated by the actuation of said first control rectifier.

6. A direct current switching device comprising a plurality of electrodes, D.C. generator means, a first control rectifier connected to a charging device, said charging device being dischargeable over a preselected period of time, said D.C. generator means being connected to said first control rectifier and said charging device, a D.C. source for charging said charging device, a plurality of second control rectifiers, each one of said plurality of second control rectifiers being connected to one of said plurality of electrodes, said first control rectifier and charging device being connected to said second control rectifiers and electrodes, a control unit, a first output from said control unit for controlling the energization of said first control rectifier, a second output from said control unit for gating the period of charging of said charging device, a sequential switching unit, a third output from said control unit providing an On pulse to said sequential switching unit, a fourth output from said control unit providing an Off pulse to said sequential switching unit, said On and Off pulses being applied to said sequential switching unit and causing said unit to provide sequenced firing pulse outputs for energizing said plurality of second control rectifiers, said plurality of second control rectifiers when energized allowing current to flow from said D.C. generator means through the electrodes connected to said energized second control rectifiers, said period of current flow being terminated by the actuation of said first control rectifier.

References Cited in the file of this patent
UNITED STATES PATENTS

| | | |
|---|---|---|
| 2,233,045 | Bonner et al. | Feb. 25, 1941 |
| 2,426,037 | Mahoney et al. | Aug. 19, 1947 |
| 2,605,742 | Burkey | Aug. 5, 1952 |